US008241817B2

(12) United States Patent
Yang et al.

(10) Patent No.: US 8,241,817 B2
(45) Date of Patent: Aug. 14, 2012

(54) APPROACH FOR IMPROVED STABILITY AND PERFORMANCE OF SOFC METALLIC INTERCONNECTS

(75) Inventors: Zhenguo Yang, Richland, WA (US); Jeffry W. Stevenson, Richland, WA (US); Guan-Guang Xia, Pasco, WA (US)

(73) Assignee: Battelle Memorial Institute, Richland, WA (US)

( * ) Notice: Subject to any disclaimer, the term of this patent is extended or adjusted under 35 U.S.C. 154(b) by 500 days.

(21) Appl. No.: 12/353,816

(22) Filed: Jan. 14, 2009

(65) Prior Publication Data

US 2010/0178586 A1 Jul. 15, 2010

Related U.S. Application Data

(60) Provisional application No. 61/023,291, filed on Jan. 24, 2008.

(51) Int. Cl.
*H01M 8/02* (2006.01)
*H01M 8/12* (2006.01)
(52) U.S. Cl. .................................. 429/522; 427/115
(58) Field of Classification Search .................. None
See application file for complete search history.

(56) References Cited

U.S. PATENT DOCUMENTS

| 3,061,482 A | 10/1962 | Grant |
| 3,077,425 A | 2/1963 | Fromson |
| 5,942,349 A | 8/1999 | Badwal et al. |
| 2004/0101733 A1* | 5/2004 | Yamanis et al. ............... 429/34 |

FOREIGN PATENT DOCUMENTS

| EP | 1 786 056 A1 | 5/2007 |
| EP | 1850412 | * 10/2007 |
| WO | WO96/28855 | 9/1996 |
| WO | WO2007-009104 A2 | 1/2007 |

OTHER PUBLICATIONS

S. Seal et al., "Improvement in the oxidation behavior of austenitic stainless steels by superficially applied, cerium oxide coatings," Oxidation of Metals 41:1-2, Feb. 1, 1994, abstract.*
Larring, Yngve, et al., Journal of the Electrochemical Society, 147 (9) (2000), pp. 3251-3256.
Yang, Zhenguo, Journal of The Electrochemical Society, 152 (9) (2005), pp. A1896-A1901.
Yang, Zhenguo, Electrochemical and Solid-State Letters, 8 (3) (2005) A168-A170.
Chen, Xuan, Solid State Ionics 176 (2005) 425-433.
International Search Report/Written Opinion, dated Jul. 2009 for PCT/US2009/031106.

* cited by examiner

*Primary Examiner* — Jonathan Crepeau
(74) *Attorney, Agent, or Firm* — A. J. Gokcek

(57) ABSTRACT

The present invention provides a material and a method for its creation and use wherein a reactive element, preferably a rare earth element, is included in an oxide coating material. The inclusion of this material modifies the growth and structure of the scale beneath the coating on metal substrate and improves the scale adherence to the metal substrate.

12 Claims, 3 Drawing Sheets

APPROACH FOR IMPROVED STABILITY AND PERFORMANCE OF SOFC METALLIC INTERCONNECTS

PRIORITY

This invention claims priority from a provisional patent application No. 61/023,291 entitled Novel Approach for Improved Stability and Performance of SOFC Metallic Interconnects filed Jan. 24, 2008, the contents of which are hereby incorporated by reference in their entirety.

STATEMENT AS TO RIGHTS TO INVENTIONS MADE UNDER FEDERALLY-SPONSORED RESEARCH AND DEVELOPMENT

This invention was made with Government support under Contract DE-AC0576RLO1830 awarded by the U.S. Department of Energy. The Government has certain rights in the invention.

BACKGROUND OF THE INVENTION

To improve their surface stability and performance, metallic interconnects (aka bipolar plates) in SOFC stacks are often fabricated with a cathode-side conductive oxide protection layer or coating. This electrically conductive oxide layer exhibits some degree of oxygen ion conduction, which allows some oxygen penetration through the protection layer, leading to oxide scale growth at the interface between the protection layer and metallic substrate. If the resulting scale/metal interface is structurally weak, spallation, peeling, or delamination can occur along the scale/metal interface. This can lead to degradation of interconnect performance and reduction of useful stack life. Scale adhesion can be improved by adding oxygen active elements to the alloy during alloy fabrication or by surface treatment of alloys with the oxygen active elements after alloy fabrication, but both of these approaches add cost. Furthermore, reactive element surface treatment may create an extra layer that can negatively affect the surface stability due to the difficulty to sintering protection layers onto the reactive oxide layer.

The present invention includes an assembly approach that includes integrating the protection layer (coating) fabrication and reactive element treatment into a single processing step. That eliminates or at least diminishes many of the problems associated with the prior art and provides new and novel advantages and features.

Additional advantages and novel features of the present invention will be set forth as follows and will be readily apparent from the descriptions and demonstrations set forth herein. Accordingly, the following descriptions of the present invention should be seen as illustrative of the invention and not as limiting in any way.

SUMMARY

The present invention provides a material and a method for its creation and use wherein a reactive element, preferably a rare earth element such as Ce, is included in an oxide coating material. The inclusion of this reactive material modifies the growth and structure of the scale beneath the coating on the metal substrate and improves the scale adherence to the metal substrate. Including this reactive element not only simplifies the surface treatment process which reduces cost, but also simplifies the interconnect structure by eliminating the extra layer and unwanted interfaces caused by reactive element surface treatment. As a result, the surface stability and performance of the interconnect are improved. This also enables the combination of two separate surface engineering processes into one, simplifying the manufacturing process and reducing processing costs, while providing a significantly improved surface engineering quality and stability as well as higher performance of these metallic interconnects compared to those of the traditional prior art processes.

In one embodiment of the invention, a coating for fuel cell interconnect systems having spinel layers of $Mn_{1.5}Co_{1.5}O_4$ with a rare earth element additive is described. (The Mn:Co ratio need not be 1:1, but may be variously configured according to the needs and necessities of the user.) While this material is provided in the example it is to be distinctly understood that the invention is not limited thereto but may be alternatively embodied to include a variety of other compositions including but not limited to Mn—Co—Fe, Mn—Co—Cu, and Mn—Co—Zn oxide and other types of coatings. While in one exemplary embodiment this rare earth element is Ce it is to be distinctly understood that this invention is not limited thereto but may be variously alternatively embodied and configured according to the needs and necessities of a user. Thus, yttrium and any of the rare earth elements (e.g., lanthanum, cerium, praseodymium, neodymium, promethium, samarium, europium, gadolinium, terbium, dysprosium, holmium, erbium, thulium, ytterbium, etc.) either alone or in combination—may be incorporated in varying amounts into these oxide coatings. Preferably the amount of rare earth element that is included in the coating is between 0.01-5%, with some embodiments having between 1 and 5%. (Note that these percentages are calculated on a "metals basis," that is, oxygen is not included in the calculation.) However, it is to be distinctly understood that the exact quantities and amounts may be variously altered and reconfigured according to the needs and necessities of the user.

In another embodiment of the invention a method for creating alloy-based interconnects with improved scale adhesion surface stability is described. This method includes the steps of applying a rare earth-containing coating on ferritic stainless steel utilizing a slurry that contains rare earth element-containing oxide powder.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. As will be realized, the invention is capable of modification in various respects without departing from the invention. Accordingly, the drawings and description of the preferred embodiment set forth hereafter are to be regarded as illustrative in nature, and not as restrictive.

DETAILED DESCRIPTION OF THE INVENTION

The following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

Figure 1A:
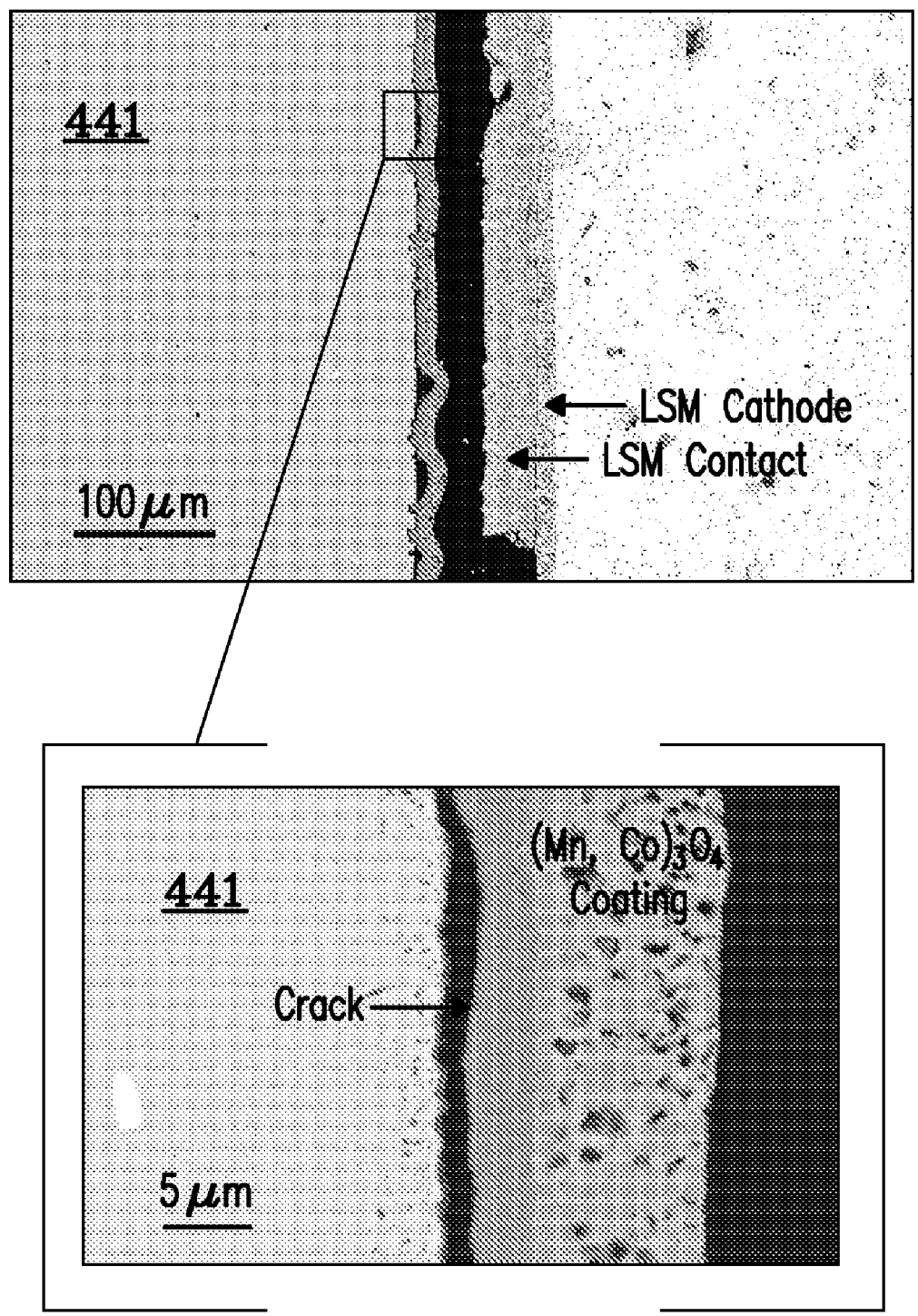
FIG. 1(a) shows an SEM micrograph of a prior art material.
Figure 1B:
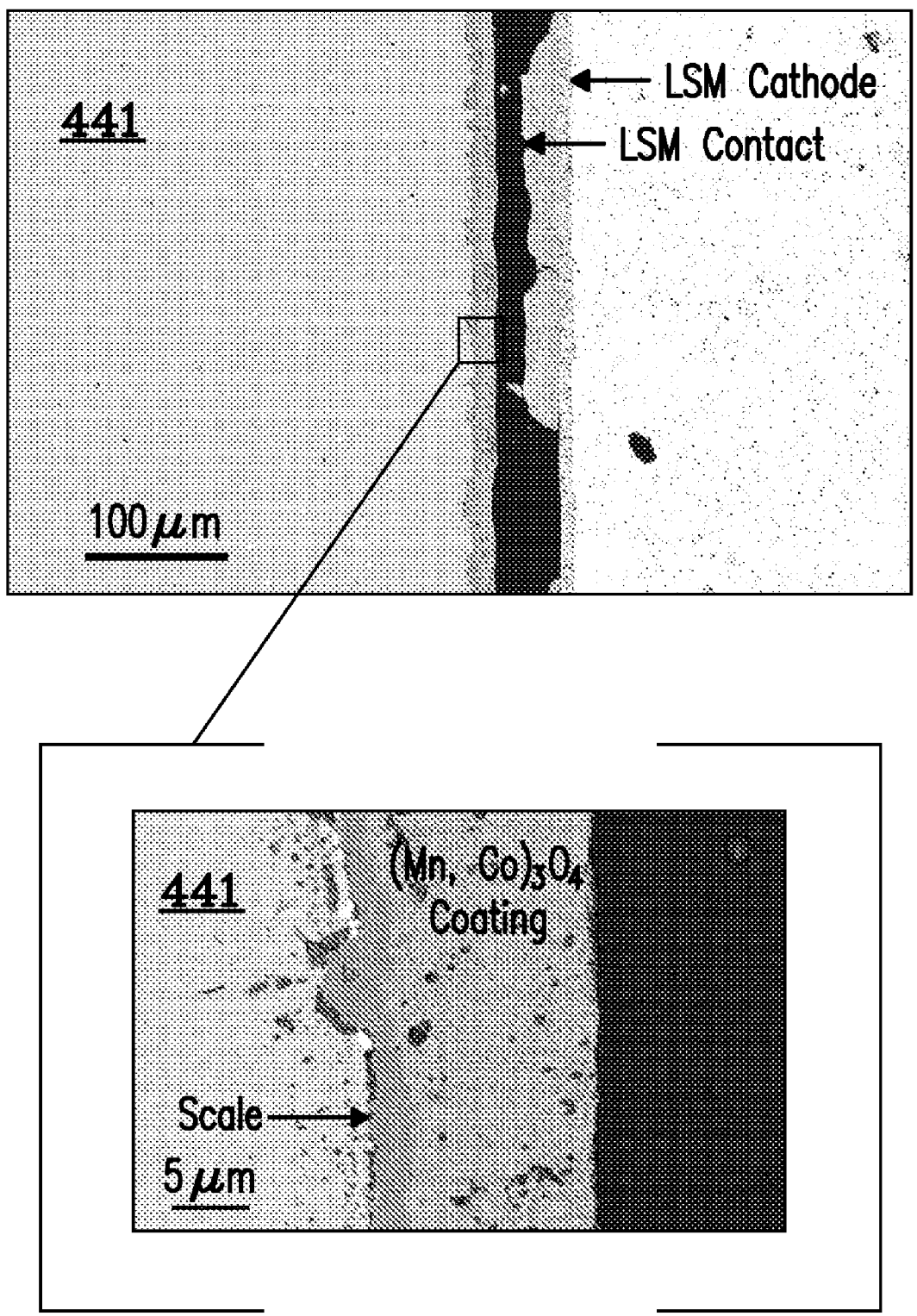
FIG. 1(b) shows a SEM micrograph of one embodiment of the present invention.
Figure 2:
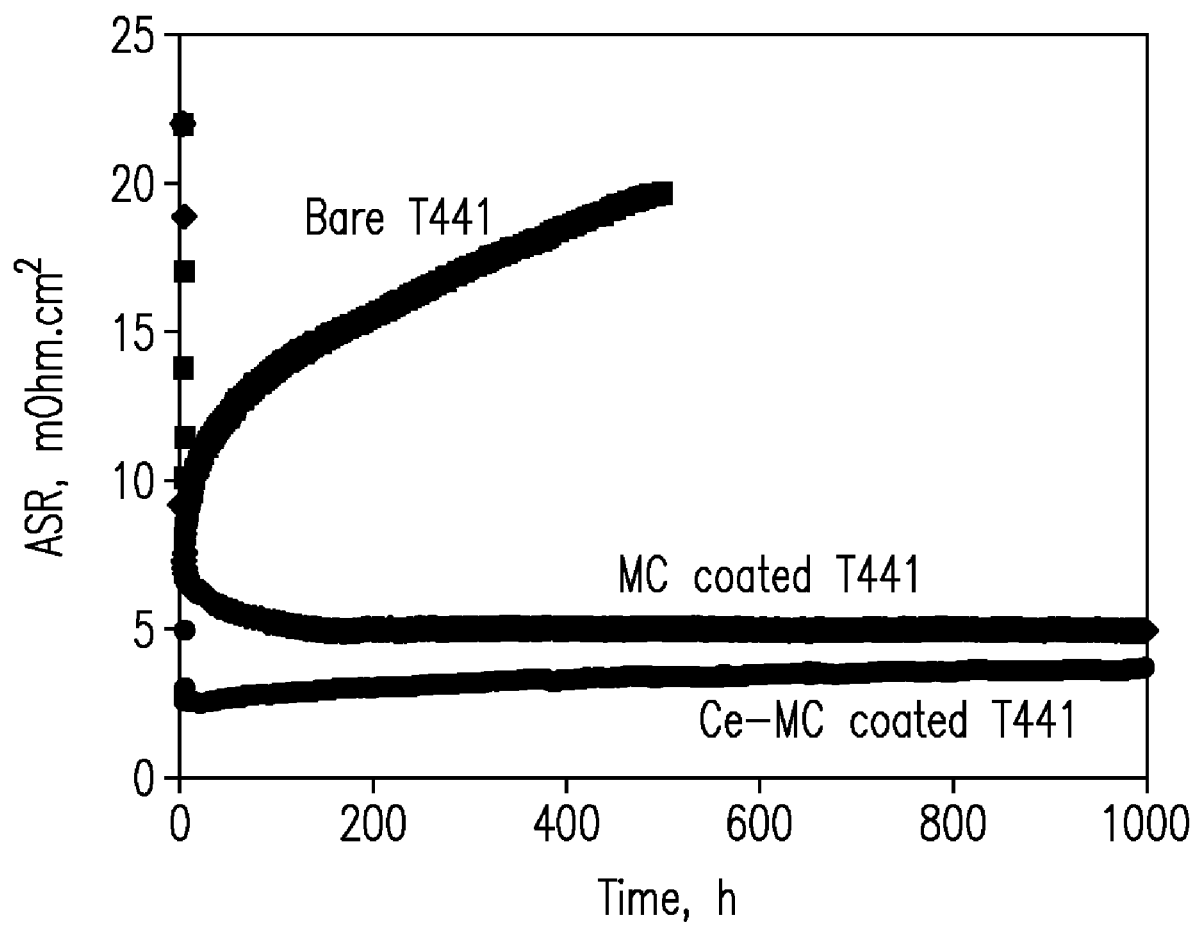
FIG. 2 is a chart showing various performance characteristics of the present invention.

FIGS. 1-3 show a variety of embodiments and features of the present invention. In these embodiments Ce-containing $Mn_{1.5}Co_{1.5}O_4$ coatings on 441 ferritic stainless steel are shown and described. While this specific example is shown it is to be distinctly understood that the present invention is not limited thereto but maybe variously alternatively configured according to the needs and necessities of a user Ferritic stainless steels appear to be a promising alloys for SOFC interconnect applications. AISI 441 stainless steel, which contains ~18% Cr and minor alloying additions including Nb and Ti, is a good example of a low cost candidate interconnect steel. To provide satisfactory performance however, the alloy in this configuration needs cathode-side protection, such as a $Mn_{1.5}Co_{1.5}O_4$ protection layer to block Cr ion outward diffusion and to mitigate oxygen ion inward diffusion. In addition, since this alloy does not contain reactive elements, the scale adhesion requires further improvement as well. As shown in FIG. 1(a), SEM observation on the cross section of a prior art sample that was tested at 850° C. in air for 1,000 hours found detachment of the scale (grown beneath the protection layer) from the metal substrate. This detachment, which could have occurred either during polishing or the final cooling of the test, indicates poor scale/alloy adhesion.

The present invention provides improved scale adhesion in such materials. In one embodiment this was demonstrated by spinel coatings prepared by slurry coating the alloy with a Ce-containing composition having the nominal formula of $Mn_{1.475}Co_{1.475}Ce_{0.05}O_4$. After testing under identical conditions and subjection to identical post-test sample preparation as for the prior art sample described earlier (non-Ce-containing $Mn_{1.5}Co_{1.5}O_4$ coated 441), the Ce-containing $Mn_{1.5}Co_{1.5}O_4$ coatings on 441 were found to be well adherent to the metal substrate (see FIG. 1(b)).

The enlarged images (see FIGS. 1(a) and (b)) show that the scale beneath the $Mn_{1.5}Co_{1.5}O_4$ coating tended to grow with a smooth interface with the metal substrate, while the scale beneath the Ce-containing $Mn_{1.5}Co_{1.5}O_4$ coating grew with a rougher interface with the metal substrate. It appears that presence of Ce in the coating altered the scale growth and interfacial structure and properties, resulting in improved scale/alloy interfacial bonding. Similar behavior was observed on samples that were tested at 800° C. for 1,000 hours in air.

In addition to the positive effects on the interfacial structure and properties, the presence of Ce had no undesirable effect on electrical resistance. In fact, as shown in the chart in FIG. 2, a 441 sample with a Ce-containing $Mn_{1.5}Co_{1.5}O_4$ protection layer demonstrated stable area-specific electrical resistance that was actually slightly lower than that of 441 with a non-Ce-containing $Mn_{1.5}Co_{1.5}O_4$ coating.

While various preferred embodiments of the invention are shown and described, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A coating for fuel cell interconnect systems characterized by:
   a. a substrate alloy of a SOFC metallic interconnect; and
   b. a single protection layer on the alloy, wherein the protection layer includes a rare earth element-containing Mn—Co spinel oxide, and wherein the adhesion between an oxide scale and the alloy is increased by the presence of the rare-earth element in the protection layer relative to a protection layer that does not contain a rare earth element.

2. The coating of claim 1 wherein the rare earth element is Cerium.

3. The coating of claim 1 wherein the protection layer includes between 0.01-5% of said rare earth element(s).

4. The coating of claim 3 wherein said rare earth element is Cerium.

5. An interconnect for fuel cells characterized by a single layer coating on the interconnect, wherein the single layer coating includes a rare earth element-containing Mn—Co spinel oxide, wherein the adhesion between an oxide scale and an alloy substrate of the interconnect is increased by the presence of the rare-earth element in the coating relative to an oxide coating that does not contain a rare earth element.

6. The interconnect of claim 5 wherein said rare earth element is Ce.

7. The interconnect of claim 5 wherein said oxide includes between 0.01-5% of said rare earth element(s).

8. The interconnect of claim 7 wherein said rare earth element is Ce.

9. The interconnect of claim 5 wherein said coating overlays a ferritic stainless steel.

10. A method of improving scale adhesion to a substrate alloy for a SOFC interconnect characterized by:
    coating the alloy with a protection layer containing a rare earth element-containing Mn—Co spinel oxide; and
    increasing the scale adhesion between an oxide scale and the alloy by the presence of the rare earth element in the protection layer relative to a protection layer that does not contain a rare earth element.

11. The method of claim 10 wherein the rare earth element is Cerium.

12. The method of claim 10 wherein the oxide includes between 0.01-5% of the rare earth element(s).

* * * * *